April 11, 1939.  K. PRITSCHOW  2,153,813
PHOTOGRAPHIC CAMERA
Filed Sept. 30, 1936    4 Sheets-Sheet 2
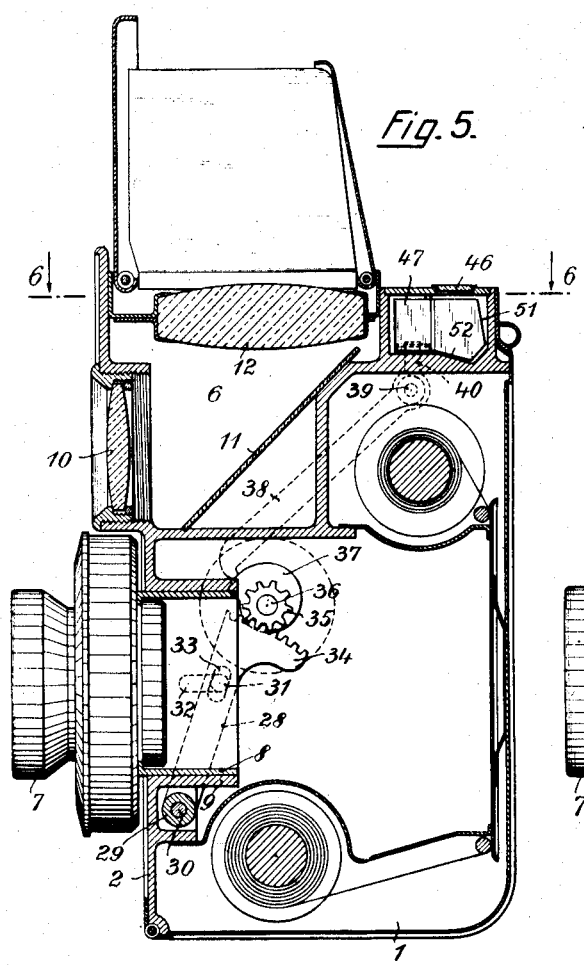
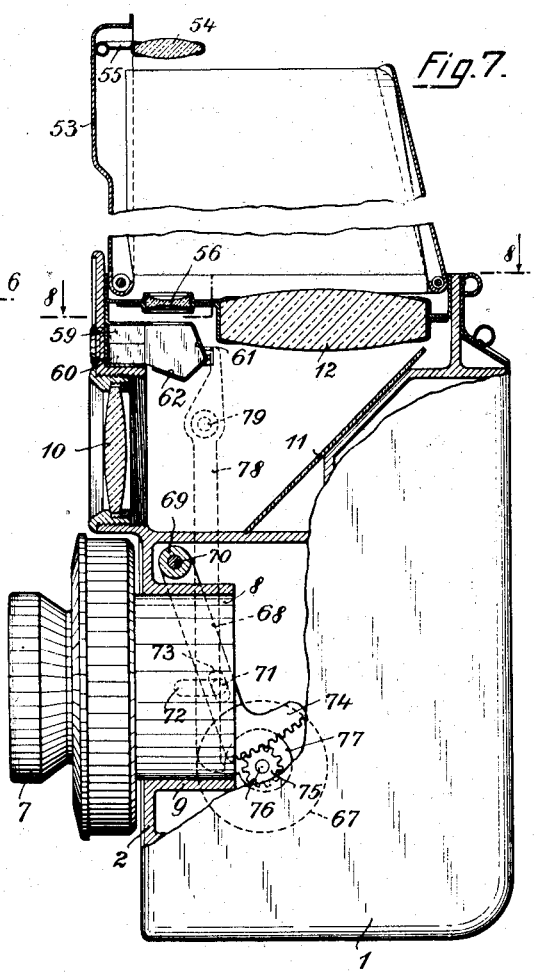
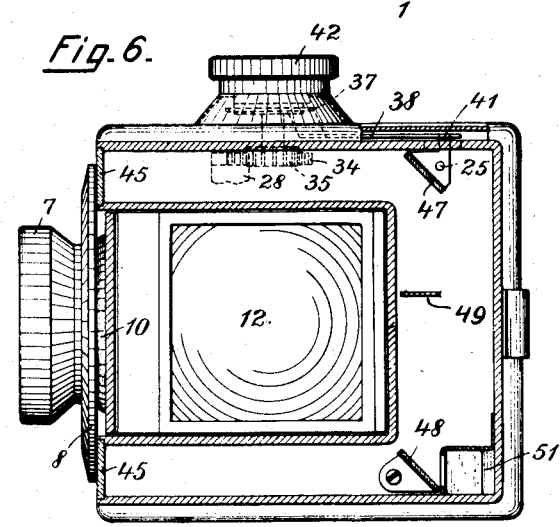
Inventor:
Karl Pritschow
by Franz Reinhow
Attorney April 11, 1939.                K. PRITSCHOW                2,153,813
                            PHOTOGRAPHIC CAMERA
                    Filed Sept. 30, 1936          4 Sheets-Sheet 3
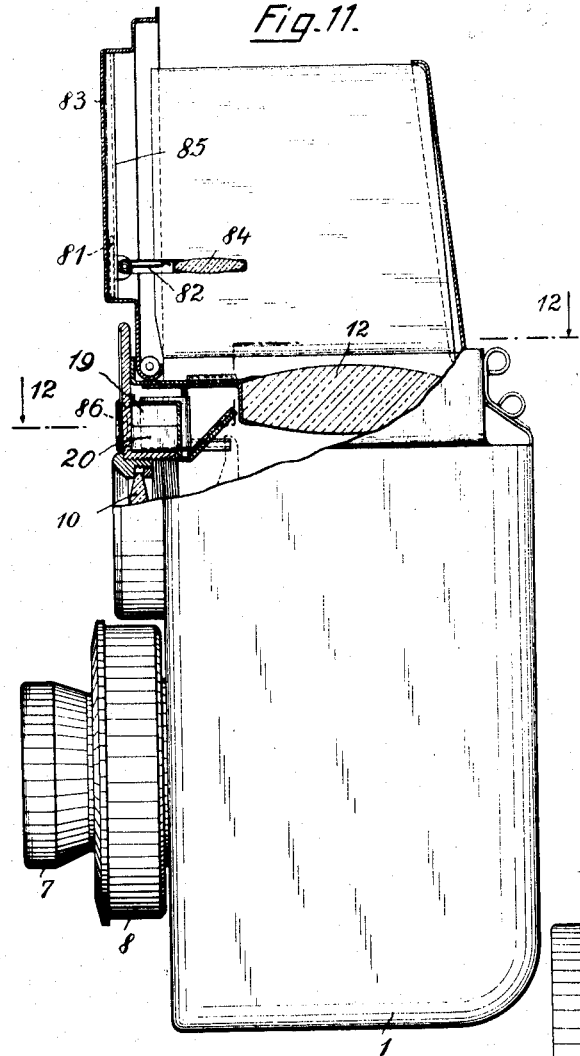
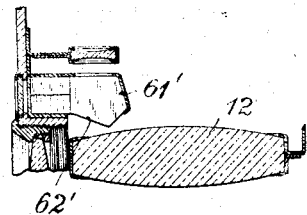
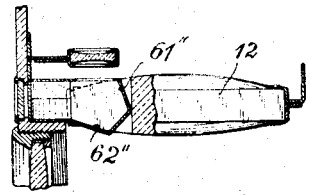
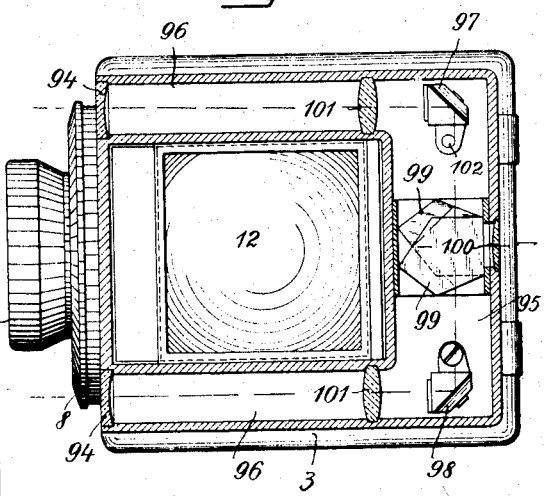
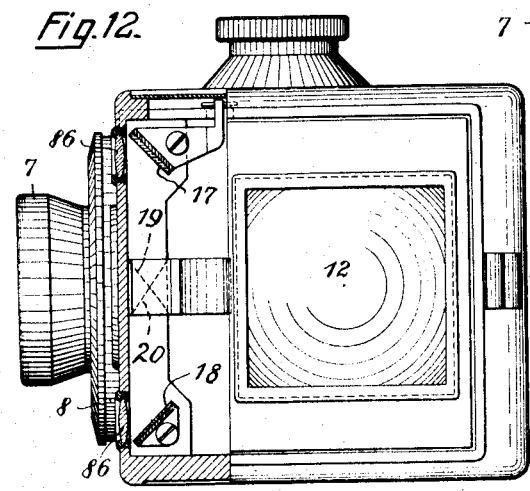
Inventor:
Karl Pritschow
by Franz Reichow
Attorney

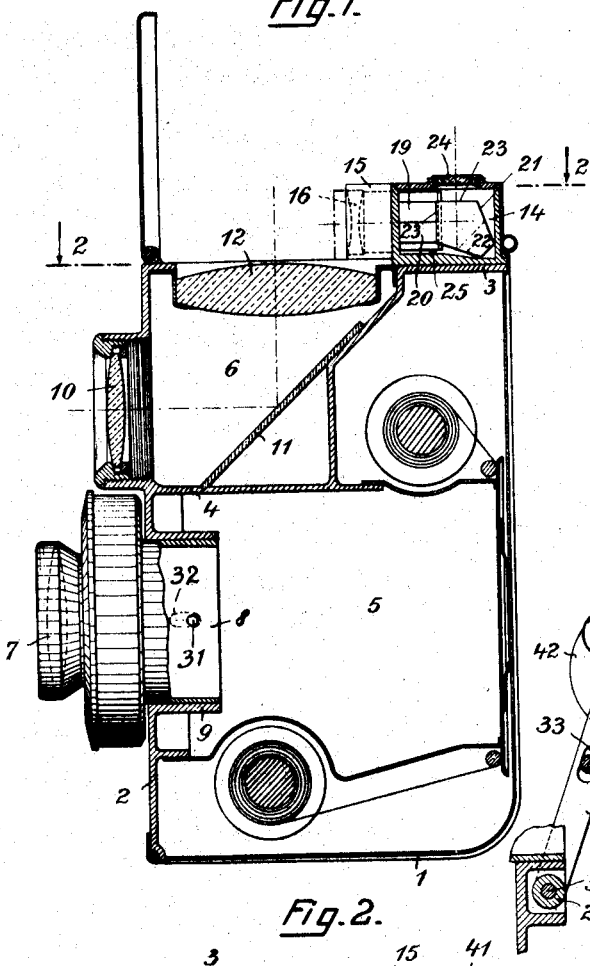

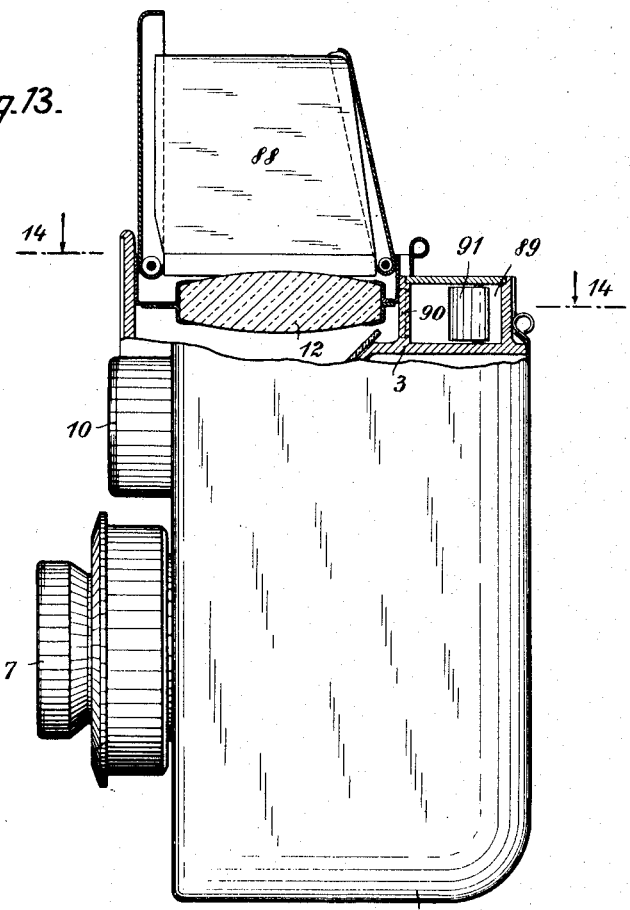
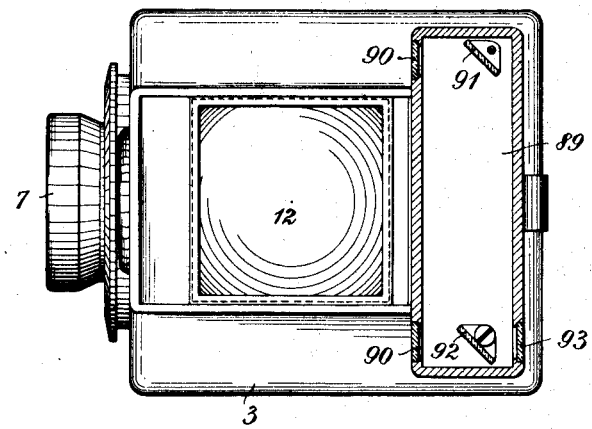

Patented Apr. 11, 1939

2,153,813

UNITED STATES PATENT OFFICE 2,153,813

PHOTOGRAPHIC CAMERA

Karl Pritschow, Brunswick, Germany, assignor to Voigtlander & Sohn Aktiengesellschaft, Brunswick, Germany, a joint-stock company of Germany Application September 30, 1936, Serial No. 103,334
In Germany March 7, 1935

6 Claims. (Cl. 95—44)

This invention relates to improvements in photographic cameras, and more particularly in cameras of the type in which a bright view finder is provided above the camera lens, which view finder comprises an object lens, a mirror adapted to direct the rays passing through said lens upwardly, and a field lens, the pencil of rays emanating from the object to be photographed passing through the finder without obstruction and dispersion by a focusing screen. As is known in the art, finders of this type produce a bright and correct image, as compared to finders in which the image of the object to be photographed is produced on a focusing screen. Such bright view finders are particularly useful when the image inspected therethrough has the same or substantially the same size as the image produced on the focusing screen. However, by means of a finder of this type focusing of the camera is not possible, and therefore focusing is effected by axially shifting the exposure lens, after first determining the distance of the object either by means of a range finder or by estimation. Thus for correctly setting the camera two different operations are needed.

One of the objects of the improvements is to provide a camera of the class indicated in which the setting of the camera by means of the view finder and focusing can be made in a more simple and speedy way, and with this object in view my invention consists in combining, with the camera and its view finder, a range finder which is arranged in the camera so that the view finder and the range finder are inspected from the same side of the camera and substantially in the same direction, so that it is necessary only slightly to displace the eye relatively to the finders for first determining the distance of the object and focusing the camera lens, and thereafter ascertaining the section of the scene appearing on the sensitized surface by means of the view finder.

Another object of the improvements is to provide a camera of the class indicated in which the section of the image inspected through the range finder is exactly the same as that inspected through the view finder and that projected on the sensitized surface. Therefore, after the character of the image has been ascertained by means of the view finder, and the camera lens has been brought to focus by means of the range finder, the exposure may be directly made, without first returning the eye into the position for looking through the view finder. This is particularly important, because after focusing the exposure may be made directly with the camera located at the height of the eye, as distinguished from exposures which are made by means of the view finder and its field lens which require the camera to be held comparatively low.

Other objects of the improvements will appear from the following description.

For the purpose of explaining the invention several examples embodying the same have been shown in the accompanying drawings in which the same reference characters have been used in all the views to indicate corresponding parts. In said drawings, Fig. 1 is a sectional elevation showing the camera, Fig. 2 is a plan view partly in section taken on the line 2—2 of Fig. 1, Fig. 3 is an elevation showing the connection between the range finder and the camera lens, Fig. 4 is a side view of Fig. 3 partly in section, Fig. 5 is a sectional elevation of the camera similar to the one illustrated in Fig. 1 and showing a modification of the range finder and the connection thereof with the camera lens, Fig. 6 is a sectional plan view taken on the line 6—6 of Fig. 5, Fig. 7 is an elevation partly in section similar to the sectional elevation showing in Fig. 1 and showing another modification of the range finder and its connection with the camera lens, Fig. 8 is a top plan view partly in section taken on the line 8—8 of Fig. 7, Figs. 9 and 10 are sectional elevations showing other modifications of the range finder, Fig. 11 is an elevation partly in section showing another modification of the range finder, Fig. 12 is a top plan view partly in section taken on the line 12—12 of Fig. 11, Fig. 13 is a sectional elevation partly in section showing another modification of the range finder, Fig. 14 is a top plan view partly in section taken on the line 14—14 of Fig. 13, and Fig. 15 is a sectional plan view showing another modification of the range finder.

In the example shown in Figs. 1 and 2 the camera comprises a casing 1 having a front wall 2 and a top wall 3, and divided by a partition 4 into an exposure chamber 5 and a finder chamber 6. In the front wall 2 there is a camera lens 7 which is adapted to be shifted in axial direction. As shown, the lens is mounted in a tube 8 which is slidable in a tubular member 9 fixed to the front wall 2.

The view finder comprises a positive object lens 10 fixed to the front wall 2, an inclined mirror 11 adapted to reflect upwardly the rays passing through the lens 10, and a horizontal field lens 12 mounted in the top wall 3. As shown, the said field lens 12 is square in plan view.

On the top wall 3 a range finder is mounted, which comprises an elongate casing 14 fixed to the top wall 3 and formed at its ends with forwardly directed branches 15. In the said branches negative lenses 16 are mounted, and at the rear of the said lenses mirrors 17 and 18 mounted at angles of 45° relatively to the optical axes of the lenses 16, the said mirrors 17, 18 being adapted to reflect the rays passing through the lenses 16 inwardly and towards each other. Between the mirrors 17 and 18 there are mirrors 19 and 20, which are disposed one above the other and which cross each other, the mirror 19 being in position for being impinged upon by the upper half of the pencil of rays reflected by the mirror 17, and the mirror 20 being in position for reflecting the lower section of the pencil of rays reflected by the mirror 18. By means of the mirrors 19 and 20 the complementary pencils of rays are reflected rearwardly to a system of mirrors adapted to throw the rays upwardly. As shown, the said system of mirrors comprises mirrors 21 and 22 inclined rearwardly and downwardly, the mirror 21 being in position for being impinged upon by the pencil of rays reflected by the mirrors 19, 20 and for reflecting the same downwardly and forwardly to the mirror 22, and the mirror 22 being adapted to reflect the rays upwardly. As shown, the mirrors 21 and 22 are provided by a pentagonal prism comprising the said reflecting surfaces 21 and 22 and faces 23 disposed relatively to each other at right angles. In the path of the rays reflected by the mirror 22 a positive lens 24 is mounted in an opening of the top wall of the tubular casing 14. The lenses 16, 16 and 24 provide two reverse Galileo telescopes which have the lens 24 in common, and which have a large field of sight and are adapted to produce a small image of the object to be photographed which is correct in elevation and lateral direction.

The crossing edges of the mirrors 19 and 20 appear in the range finder as a section line which separates the complementary sectional images of the object.

The mirror 17 is mounted on a vertical axis 25, and it is adapted to be turned about the said axis, in accordance with the distance of the object to be photographed, so that the complementary pencils are correctly combined in the range finder, as is known in the art. The shaft 25 of the mirror 17 is connected with the focusing device of the lens 7, so that the said lens is focused by the setting of the mirror 17, or vice versa. Any suitable mechanism may be provided for this purpose. As is shown in Figs. 3, 4 and 5, at opposite sides of the tubular member 9 arms 28 are located within the camera casing the hub 29 of which is rockingly mounted on a shaft 30 secured to the side wall of the casing. Pins 31 fixed to the tube 8 are passed through slots 32 and 33 made respectively in the tubular member 9 and the arm 28. One of the arms 28 carries a toothed segment 34 which is in mesh with a pinion 35 secured to an arbor 36 mounted in one of the side walls of the camera casing. To the arbor 36 a cam 37 is secured which is engaged by an arm 38 mounted on a pivot bolt 39. An upwardly directed finger 40 of the arm 38 engages an arm 41 connected with the mirror 17. To the shaft 36 a milled disk 42 is secured.

The camera is used as follows:

For taking a photograph the photographer at first directs the view finder 10, 11, 12 towards the object to be photographed and he ascertains the section of the object which he desires to project on the sensitized film. After the position of the camera has thus been ascertained, the photographer looks through the range finder while lifting the camera to the proper position relatively to the eye, and he turns the mirror 17 by means of the milled disk 42 until the two sections of the image appearing in the range finder are in register. By means of the milled disk 42 the cam disk 37 is turned which acts through the lever 38 on the mirror 17. By the same operation of the milled disk the camera lens is shifted axially into the proper position by means of the pinion 35, the toothed segment 34 and the lever 28.

When the view finder and thereafter the range finder are used, only slight displacement of the eye of the photographer is necessary, because both finders are inspected from the same side. The construction of both finders is such that the same section of the object which appears in the view finder appears in the range finder, and therefore the photograph may be directly taken with the camera located near the eye. Thus the image produced on the sensitized surface appears quite natural, because it is taken from a point near the eye of the photographer.

In Figs. 5 and 6 I have shown a modification in which a range finder of different construction is provided. As shown the said range finder consists exclusively of mirrors, the lenses being omitted. Thus the rays of the pencils passing through the range finder are parallel to one another. The base line of the range finder is likewise arranged at the rear of the square field lens 12, and at the ends of the said base line angularly disposed mirrors 47 and 48 are provided, the said mirrors being parallel to each other. The mirror 47 is a completely reflecting mirror, while the mirror 48 is partly permeable to light as is known in the art. At the rear of the mirror 48 a reflecting system is provided for directing the rays upwardly, the said reflecting system comprising reflecting surfaces 51 and 52 formed on the sides of a pentagonal prism, the construction of the said prism being the same as that described with reference to Figs. 1 and 2. In the front wall, or at a suitable part between the mirrors 47 and 48 and the said front wall, windows 45 are provided the dimensions of which are such that the section of the object to be photographed viewed through the range finder is substantially the same as that viewed through the view finder and projected on the sensitized surface when the eye of the attendant is disposed relatively to the field lens 12 and the range finder so that it is as near thereto as possible and the sight is still sharp. At the rear of the mirror 48 and above the prism 51, 52 a window 46 is made in the top wall 3 of the casing 1. By constructing the range finder with the window 46 located at one side of the camera the attendant is enabled to look through the range finder with one eye and through the view finder with the other eye, so that the necessary displacement of the eyes from the range finder to the view finder or vice versa is small.

The mirror 47 is operatively connected with the focusing mechanism of the camera lens by mechanism similar to the one described with reference to Figs. 3 and 4.

The image of the object viewed directly through the semi-transparent mirror 48 is superposed upon the image reflected by the mirrors 47 and 48, and in order to distinguish the two images for convenience in setting the mirror 47 a colored screen may be provided in the path of the rays passing from the mirror 47 to the mirror 48, as is indicated at 49.

In Figs. 7 and 8 I have shown another modification, in which the range finder is located in front of the field lens 12 of the view finder, and in which the ocular lens of the range finder is located as high as is possible, in view of the dimensions of the camera, the said ocular lens being mounted on the upper part of one of the hinged plates forming the viewing or focusing hood of the view finder. In consequence, the necessary displacement of the eye in successively inspecting the finders is reduced to a minimum.

In the said figures the parts of the camera are the same as those described with reference to Figs. 1 to 6, and the range finder is connected with the camera lens by mechanism similar to the one shown in Figs. 3 and 4.

The range finder comprises two mirrors 57 and 58 located near the front wall of the camera casing 1, a pair of crossing mirrors 59 and 60, a pentagonal prism having two reflecting surfaces 61 and 62, a negative lens 56 located above the said prism, and a positive lens 54 the mounting 55 of which is hinged to the hinged front wall 53 of the viewing or focusing hood of the view finder. The mirror 57 is adapted to be turned about a vertical axis 65.

The connection between the said mirror 57 and the focusing device is similar to the one shown in Figs. 5 and 6. The shaft 65 is connected with an arm 80 which is acted upon by the upwardly directed arm of a lever 78 rockingly mounted at 79. The downwardly directed arm of the said lever is engaged by a cam 77 secured to an arbor 76. On the said arbor a milled disk 67 is mounted. Further, a pinion 75 is secured to the arbor 76, and the said pinion is in engagement with a toothed sector 74 formed on one of two arms 68 rockingly mounted at 70. To the tube 8 pins 71 are secured which pass through slots 72 and 73 made respectively in the tube 8 and the tubular member 9.

The camera is used in the same way as the cameras described with reference to Figs. 1 to 6. However, the size of the image viewed through the range finder is comparatively small, which is not objectionable, for the reason that a large size image is viewed through the view finder for ascertaining the section of the scene to be photographed. The position of the eye inspecting the finders is substantially the same, and only slight displacement of the eye is needed when the finders are used.

In Fig. 9 I have shown a modification which is similar to the construction shown in Figs. 7 and 8, in which, however, the pentagonal prism 61', 62' is located above the field lens 12, the base line of the range finder being accordingly located higher than the field lens 12.

In the modification shown in Fig. 10 the pentagonal prism 61'', 62'' is located in a cut-out portion made in the field lens 12. Otherwise the construction and operation of the cameras shown in Figs. 9 and 10 is the same as that described with reference to Figs. 7 and 8.

In Figs. 11 and 12 I have shown a modification in which the range finder comprises positive object lenses 86, the said lenses producing a real image of the object, and the said image is inspected by means of a positive ocular lens 84. The other parts of the range finder are similar in construction to those shown in Figs. 1 and 2, and the same reference characters have been used to indicate corresponding parts. The range finder is preferably mounted at the front side of the camera casing and in front of the field lens 12. The ocular lens 84 is foldably mounted on the hinged cover plate 83 of the finder. Preferably its hinge is carried by a slide 81 mounted on guide ways 85 provided on the cover plate 83, the lens being preferably held in set position by means of a spring 82. Thus the lens 84 may be shifted upwardly and downwardly for permitting sharp inspection of the real image produced by the lenses 86. By means of the range finder shown in Figs. 11 and 12 a comparatively small image of the object is produced in which also the crossing line of the crossing mirrors 19, 20 is sharp. Further, the proper position of the eye is at a comparatively large distance above the ocular lens 84.

In the foregoing reference has been made to cameras in which the range finders are inspected from above. In Figs. 13 to 15 I have shown modifications in which the range finders are inspected from the rear of the camera. The section of the scene viewed through the range finder is the same as that viewed through the view finder, and therefore the section of the scene to be photographed may be selected by means of the view finder, and the exposure may be made while the photographer looks through the range finder and while the camera is located at the height of the eye, thus producing a natural photograph of the scene.

In Figs. 13 and 14 the construction of the camera is the same as that described with reference to Figs. 1 to 12, and the same letters of reference have been used to indicate corresponding parts. At the rear of the viewing or focusing hood 88 an elongate casing 89 is mounted on the top wall 3 of the camera casing and the said casing is provided at its front side with windows 90. At the rear of the said windows there are angularly disposed mirrors 91 and 92 which are parallel to each other and which have their reflecting surfaces respectively at their front and rear sides, the mirror 91 completely reflecting the rays impinging thereon, and the mirror 92 being partly transparent. Thus the rays coming from the object are reflected by the mirror 91 and thrown on the reflecting rear face of the mirror 92, from which they are further reflected rearwardly and through a window 93. The pencil of rays coming from the object to be photographed and meeting the mirror 92 partly passes through the said mirror and through the window 93. Thus two images are produced, which are brought into register by turning the mirror 91 about its vertical axis, as has been described with reference to Figs. 5 and 6.

In the modification shown in Fig. 15 at the rear of the focusing or viewing hood (not shown) an elongate casing 95 is mounted on the top wall 3 of the camera casing, which casing is formed with forwardly directed branches 96 located at either side of the viewing or focusing hood and extending to the front side of the camera casing. The optical system of the range finder comprises negative lenses 94 located at the front ends of the branches 96, angular mirrors or reflecting roof edge prisms 97, 98, a pair of pentagonal prisms 99 having their reflecting surfaces disposed vertically, and a positive ocular lens 100.

Between the negative lenses 94 and the mirrors 97 and 98 positive reversing lenses 101 are located. The mirror 97 is adapted to be turned about a vertical axis 102, and it is connected with the camera lens by mechanism similar to the one shown in Figs. 3 and 4.

By means of the optical system of the range finder a real image of the scene is produced, and the pencils of rays passing through the lenses 94 are divided by the superposed pentagonal prisms 99, 99 into upper and lower sections representing complementary parts of the scene, and the said sections are correctly combined by setting the mirror 97 in accordance with the distance of the object.

In the constructions shown in Figs. 1, 2, 5, 6, 7, 8, 11, 12, 13, 14, and 15 the paths of the pencils of rays are located laterally of the field lens 12 or the viewing or focusing hood. Thus, the room left by the comparatively large view finder and its hood is made use of for disposing the range finder. The aggregate transverse extent of the field lens of the view finder and of the mirrors of the range finder is substantially equal to the entire space interval between the planes of the side walls of the casing.

I claim:

1. A camera comprising a casing having an exposure opening, a camera lens, a view finder located above said camera lens and comprising an inclined mirror adapted to throw upwardly the rays emanating from the object to be photographed, and a range finder having its base line located in front of the upwardly directed portion of said view finder and comprising a pair of mirrors located respectively at the ends of said base line in positions for being impinged upon by the rays emanating from the object to be photographed and for directing the said rays towards each other, mirrors in the paths of said reflected rays and adapted to combine rays coming from complementary portions of the object to be photographed into a pencil corresponding to the said object and to direct the same upwardly, and means for setting the elements of said range finder in accordance with the distance of the object to be photographed into positions for combining the complementary pencils of rays passing through said range finder into a pencil correctly representing the object to be photographed, in which camera the view finder ends in a viewing hood, and in which the range finder comprises a positive object lens and a positive ocular lens mounted on the front wall of said viewing hood, said positive ocular lens being hinged to the said wall.

2. A camera comprising a casing having an exposure opening, a camera lens, a view finder located above said camera lens and comprising an object lens, an inclined mirror adapted to throw the rays emanating from the object to be photographed upwardly, and a field lens, and a range finder having its base line located in front of the upwardly directed portion of said view finder and comprising a pair of positive lenses and mirrors located at the ends of said base line in positions for being impinged upon by the rays emanating from the object to be photographed and for directing the rays towards each other, mirrors in the path of said reflected rays adapted to reflect rays coming from complementary portions of the object to be photographed rearwardly and to combine the same into a pencil corresponding to the object to be photographed, a mirror adapted to reflect the said combined pencil of rays upwardly, and a positive lens in the path of the said reflected combined pencil of rays, and means for setting the elements of the said range finder in accordance with the distance of the object to be photographed into positions for combining the complementary pencils of rays passing through said range finder into a pencil correctly representing the object to be photographed.

3. A camera as claimed in claim 2, in which the focal length of the said positive lenses located at the ends of the base line is such that the image of the object to be photographed produced by the said lenses is located between the said combining mirrors and the upwardly reflecting mirror.

4. A camera as claimed in claim 2, in which the upwardly reflecting mirror is located between the said combining mirrors and the said positive lens located in the path of the reflected combined pencil of rays.

5. In a photographic camera the combination of a box, a camera lens set in the front wall of the box, a view finder including an object lens set in the front wall of the box, a reflector within the box, and a field lens set horizontally in the top wall of the box and of less transverse extent than the width of the box, through which the view is to be seen from above, and a range finder including a casing mounted transversely at the top and within the confines of the box and in the plane of the field lens and extending laterally beyond and on opposite sides of the field lens of the view finder, said range finder including entrance apertures on each side of the field lens of the view finder and two relatively adjustable mirrors arranged within and at opposite ends of the said casing and means for combining in a single field of view the rays reflected by the two said mirrors.

KARL PRITSCHOW.